United States Patent
Ohmi et al.

[11] Patent Number: 5,980,806
[45] Date of Patent: Nov. 9, 1999

[54] METHOD OF PRODUCING A PLASTIC CONTAINER CLOSURE

[75] Inventors: Hidehiko Ohmi; Tateo Kubo; Tomoya Igarashi, all of Hiratsuka, Japan

[73] Assignee: Japan Crown Cork Co., Ltd., Tokyo, Japan

[21] Appl. No.: 09/044,092

[22] Filed: Mar. 19, 1998

Related U.S. Application Data

[62] Division of application No. 08/720,924, Oct. 7, 1996, Pat. No. 5,769,255, which is a continuation of application No. 08/395,301, Feb. 28, 1995, abandoned.

[30] Foreign Application Priority Data

Jun. 22, 1994 [JP] Japan ................................ 6-140056

[51] Int. Cl.$^6$ ........................... B29C 39/10; B29C 39/26
[52] U.S. Cl. ........................................... 264/268; 264/319
[58] Field of Search ............................... 264/266, 268, 264/255, 250, 254, 328.7, 319; 215/345, 344, 341, 343

[56] References Cited

U.S. PATENT DOCUMENTS

| | | |
|---|---|---|
| 3,547,746 | 12/1970 | Gwinner . |
| 3,881,627 | 5/1975 | Davolt ................................... 215/329 |
| 4,059,198 | 11/1977 | Mumford ............................ 215/350 X |
| 4,076,152 | 2/1978 | Mumford ............................ 215/350 X |
| 4,114,775 | 9/1978 | Shinozaki ............................ 215/343 X |
| 4,261,475 | 4/1981 | Babiol .................................. 215/341 |
| 4,276,989 | 7/1981 | Hicks .................................. 215/344 X |
| 4,322,012 | 3/1982 | Conti ................................... 215/344 |
| 4,407,422 | 10/1983 | Wilde et al. ........................ 215/343 X |
| 4,629,082 | 12/1986 | Badia Iniesta ........................ 215/252 |
| 4,629,083 | 12/1986 | Druitt ................................. 215/350 X |
| 4,709,825 | 12/1987 | Mumford ............................ 215/350 X |
| 4,721,221 | 1/1988 | Barriac ................................. 215/350 |
| 4,905,852 | 3/1990 | Zumbuhl ............................ 215/344 X |
| 5,064,084 | 11/1991 | McBride et al. ....................... 215/350 |
| 5,090,788 | 2/1992 | Ingram et al. .......................... 215/252 |
| 5,161,707 | 11/1992 | Dutt et al. ............................... 215/344 |
| 5,259,522 | 11/1993 | Morton .............................. 215/343 X |
| 5,265,747 | 11/1993 | Gregory et al. ....................... 215/349 |
| 5,275,287 | 1/1994 | Thompson ........................... 215/341 X |

FOREIGN PATENT DOCUMENTS

| | | |
|---|---|---|
| 1018172 | 12/1952 | France . |
| 2514326 | 4/1983 | France . |
| 167054 | 6/1989 | Japan . |
| WO8500154 | 1/1985 | WIPO . |

*Primary Examiner*—Angela Ortiz
*Attorney, Agent, or Firm*—Sughrue, Mion, Zinn, Macpeak & Seas, PLLC

[57] ABSTRACT

A plastic container closure comprising a top panel, a skirt portion, an annular protruded portion that is formed inwardly from the inner surface of the top panel and on the inside of a portion near the root of the skirt maintaining a small gap therebetween, and a sealing liner that is fitted by press-molding on the inside of the top panel, wherein a substantially vertical portion is formed on said liner along the inner surface of the annular protruded portion, and sealing performance is maintained by the engagement between the outer edge of the mouth of the container and the substantially vertical portion. Since the sealing is accomplished over a surface having a predetermined width in the up-and-down direction, the sealing performance is not impaired even when the top panel is deformed by the pressure. Moreover, favorable sealing performance is maintained even against shock that is given to the container at the time of fitting the closure.

4 Claims, 6 Drawing Sheets

F I G. 1
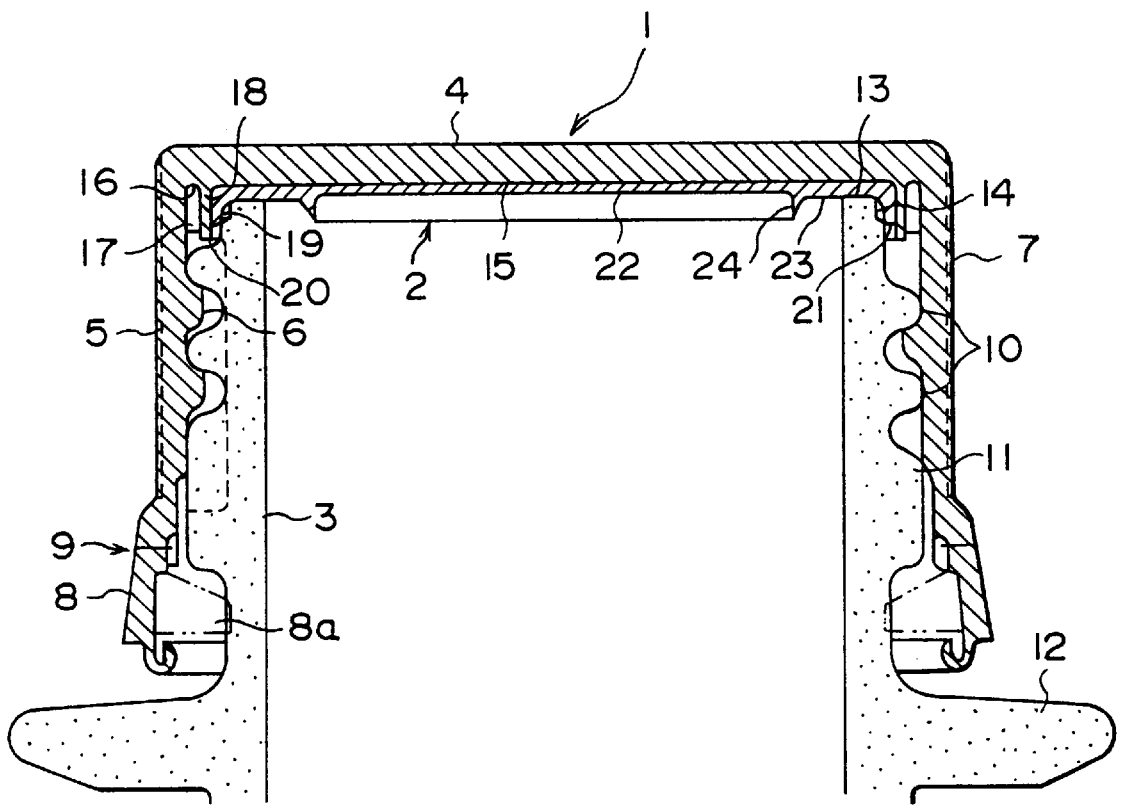

METHOD OF PRODUCING A PLASTIC CONTAINER CLOSURE

This is a divisional of application No. 08/720,924 filed Oct. 7, 1996, now U.S. Pat. No. 5,769,255, which is a continuation of U.S. Pat. No. 08/395,301, filed Feb. 28, 1995 now abandoned.

BACKGROUND OF THE INVENTION

1. (Field of the Invention)

The present invention relates to a plastic container closure and to a method of producing the same. More specifically, the invention relates to a plastic container closure with liner featuring high sealing precision, excellent sealing performance to the mouth of the container and, particularly, excellent shock-resistant sealing performance and pressure-resistant sealing performance, and to a method of producing the same.

2. (Description of the Prior Art)

In recent years, metal container closures have been replaced by plastic container closures for hermetically sealing the mouths of plastic bottles and glass bottles owing to their merits of easy disposal and recycled use.

Some plastic container closures use, as the sealing material, the synthetic resin itself that is forming the inner surface of the top panel of the container closure. From the standpoint of obtaining hermetically sealing performance and, particularly, pressure-resistant sealing performance, however, it is desired to employ a liner or a packing that is excellent in softness and cushioning property.

Japanese Patent Publications Nos. 44627/1988, 48704/1988 and 8141/1994 are disclosing container closures provided with a liner, wherein provision is made of an inwardly extending annular liner-holding member on the inner surface of a skirt portion which is integrally continuous to the outer peripheral edge of the top panel, so that the liner will not escape from the closure shell.

Furthermore, Japanese Patent Publication No. 13349/1994 discloses a plastic container closure having a packing provided in the closure shell and further having a plurality of annular ribs formed on the top panel of the container closure.

According to the former-method of providing an annular liner-holding member on the inner surface of the skirt portion, however, a portion of the annular holding member of the container closure shell must be forcibly released at the time of molding the container closure shell and, hence, the annular liner-holding member must have a reduced thickness. In press-molding the liner, therefore, the annular holding member is deformed in an undulated manner at the time of bringing the outer sleeve of the molding tool and the annular holding member into engagement together, whereby the liner leaks outwardly or it becomes difficult to strictly control the size of the sealing portion on the outer periphery of the liner.

The container closure used for the contents that produce pressure loses pressure-resistant sealing performance due to its buckling deformation at the top panel portion. It is therefore desired to accomplish the sealing along the outer peripheral portion of the mouth of the bottle rather than at the top of the mouth of the bottle. The above-mentioned former container closure, however, does not permit to establish even such a sealing structure.

On the other hand, the latter container closure is satisfactory from the standpoint of accomplishing the sealing along the outer peripheral portion of the mouth of the bottle, but requires cumbersome operation for fitting the packing piece by piece into a number of container closures. Besides, the packing that is fitted may often escape, which is not still satisfactory from the viewpoint of operability.

SUMMARY OF THE INVENTION

The object of the present invention, therefore, is to provide a plastic container closure with liner featuring high sealing precision, excellent sealing performance to the mouth of the container and, particularly, excellent shock-resistant sealing performance and pressure-resistant sealing performance, and a method of easily producing the same.

Another object of the present invention is to provide a method of producing a plastic container closure, which method is capable of easily forming the closure shell as well as the liner and, besides, capable of forming the liner maintaining a high dimensional precision.

According to the present invention, there is provided a plastic container closure with liner comprising a top panel of the plastic container closure, a skirt portion which downwardly extends from the peripheral edge of said top panel and has a thread formed in the inside thereof to come into engagement with the mouth of the container, an annular protruded portion that is formed inwardly from the inner surface of said top panel and on the inside of a portion near the root of the skirt maintaining a small gap therebetween, and a sealing liner that is fitted by press-molding on the inside of said top panel, wherein a substantially vertical portion is formed on said liner along the inner surface of said annular protruded portion, and sealing performance is maintained by the engagement between the outer edge of the mouth of the container and the substantially vertical portion of the liner.

According to the present invention, furthermore, there is provided a method of producing a plastic container closure with liner, comprising:

feeding a resin for molding the liner into the inner surface of a top panel of a plastic container closure which has the top panel, a skirt portion which is threaded in the inside thereof for engagement with the mouth of a container, and an annular protruded portion that stands nearly upright from the inner surface of the top panel maintaining a small gap from the skirt portion;

arranging a core having a tip for molding the central portion of the liner, an intermediate bush having a tip for molding a sealing portion of the liner, and an outer sleeve having a tip for engagement with said annular protruded portion of the container closure, in concentric with one another;

advancing said tips toward the top panel of the container closure, so that said tip for engagement is brought into engagement with the annular protruded portion of the container closure and that said tip for molding the sealing portion of the liner is brought into engagement with the top panel of the container closure;

pressing in this state the resin for molding the liner using the core, so that the intermediate bush is retreated by the resin pressure; and flowing the resin into space defined by said tip for molding the sealing portion of the liner, said tip for engagement, peripheral portion on the inner surface of the top panel, and inner side surface of said annular protruded portion, thereby to mold the central portion of the liner having a reduced thickness, to mold the peripheral portion of the liner having a thickness larger than that of the central portion, and to mold a substantially vertical portion of the liner on the inner side surface of said annular protruded portion.

In the present invention, it is most desired that the inner peripheral surface of the annular protruded portion is provided substantially vertically to the top panel, the inner peripheral surface of the annular protruded portion has a diameter larger than that of the mouth of the container that is to be sealed but is smaller than the diameter of the threaded portion that engages with the mouth of the container. It is further desired that the annular protruded portion has a shape that becomes narrow toward the tip thereof and has an outer peripheral surface that is tilted inwardly and, particularly, that the annular protruded portion has a flexible tip of which the inner peripheral surface is slightly tilted inwardly toward the end thereof or has a tip that is inwardly protruding. Moreover, the annular protruded portion may have the inner peripheral surface that is substantially vertical or may have the inner peripheral surface that is tilted slightly inwardly.

According to the present invention, it is desired to arrange a plurality of ribs along the circumference between the annular protruded portion and a portion near the root of the skirt to bridge them together, and it is particularly desired that the plurality of ribs are arranged at an angle that is tilted relative to the radial direction.

The plastic container closure of the present invention comprises a plastic closure shell and a liner provided on the side of the inner surface of the shell. Besides, the closure shell comprises the top panel and the skirt portion which is threaded in the inner peripheral surface thereof for engagement with the container. Distinguished features reside in that the annular protruded portion is provided inwardly from the inner surface of the top panel and on the inside of a portion near the root of the skirt maintaining a small gap therebetween and that the substantially vertical portion (falling portion) of the liner is formed along the inner side surface of the annular protruded portion.

That is, with the annular protruded portion being provided on the inner surface of the top panel, the liner member that outwardly tends to spread in the radial direction due to the press-molding is blocked by the protruded portion to form a substantially vertical portion (rising portion in the case of the press-molding), and sealing is accomplished over a cylindrical surface having a predetermined width in the up-and-down direction between the outer peripheral portion of the mouth of the container and the substantially vertical portion of the liner. Accordingly, the plastic container closure with liner of the present invention maintains pressure-resistant sealing even when the top panel is deformed by the pressure. Besides, the force that acts between the annular protruded portion and the substantially vertical portion of the liner at the time of closing or opening the container, is chiefly a shearing force in the up-and-down direction or in the circumferential direction, which is not a peeling force. Therefore, the sealing performance is not impaired between the annular protruded portion and the substantially vertical portion of the liner.

Moreover, since a small gap is provided between the annular protruded portion and the portion near the root of the skirt, the annular protruded portion tolerates elastic deformation that outwardly expands in the radial direction. Therefore, despite there exists some dimensional error in the outer periphery of the mouth of the container, reliable sealing is accomplished when the container is closed, and markedly improved shock-resistant sealing performance is exhibited being compounded by the sealing over the surface that has a width in the up-and-down direction.

Furthermore, with the annular protruded portion being provided on the inner surface of the top panel, this portion needs not be forcibly released from the metal mold at the time of molding the container closure shell. Accordingly, the molding operation is easy, and no particular limitation is imposed on the shape and size of the annular protruded portion.

According to the production method of the present invention, the liner is formed in a predetermined shape by feeding a resin for molding the liner into the inner surface of the top panel of the plastic container closure and by press-molding the resin, and further arranging a core having a tip for molding the central portion of the liner, arranging an intermediate bush having a tip for molding a sealing portion of the liner, and arranging an outer sleeve having a tip for engagement with said annular protruded portion of the container closure, all in concentric with one another, advancing said tips toward the top panel of the container closure, so that said tip for engagement is brought into engagement with the annular protruded portion of the container closure and that said tip for molding the sealing portion of the liner is brought into engagement with the top panel of the container closure, pressing in this state the resin for molding the liner using the core, so that the intermediate bush is retreated by the resin pressure, and flowing the resin into space defined by said tip for molding the sealing portion of the liner, said tip for engagement, a peripheral portion on the inner surface of the top panel, and an inner side surface of said annular protruded portion, thereby to mold the central portion of the liner having a reduced thickness, to mold the peripheral portion of the liner having a thickness larger than that of the central portion, and to mold a substantially vertical portion of the liner on the inner side surface of said annular protruded portion.

According to this method, the thick peripheral portion of the liner and the substantially vertical portion of the liner are molded by the resin pressure in a state where the tip of the outer sleeve of the molding tool and the annular protruded portion are reliably engaged with each other. Besides, the liner material does not leak to the outer side beyond the annular protruded portion, and the liner is molded having favorable shape and dimensional precision.

According to the present invention, the inner peripheral surface of the annular protruded portion is molded to be substantially vertical with respect to the top panel, and the inner peripheral surface of the annular protruded portion has a diameter which is larger than the diameter of the outer periphery of the mouth of the container that is to be closed but is smaller than the diameter of the inner periphery of the threaded portion that engages with the mouth of the container, so that the container can be easily closed or opened, and that the container closure shell can be easily molded and the liner can be easily press-molded, too.

By so molding the annular protruded portion that it becomes narrow toward the tip thereof and that its inner peripheral surface is slightly tilted inwardly, it is made possible to easily draft the mold at the time of molding the container closure shell as well as to reliably hold the liner in the shell and to reliably bring the annular protruded portion and the outer sleeve used for the molding into engagement with each other maintaining sealing. To obtain the above-mentioned actions and effects, in particular, the annular protruded portion should have a flexible tip that becomes narrow toward the end thereof and the inner peripheral surface that is slightly tilted inwardly toward the end thereof or a flexible tip that protrudes inwardly. The inner peripheral surface of the annular protruded portion may be vertical or may be slightly tilted inwardly.

BRIEF DESCRIPTION OF THE DRAWINGS

FIG. 1 is a side sectional view illustrating a container closure of the present invention together with the mouth of a container;

DETAILED DESCRIPTION OF THE INVENTION

[Container Closure]

Figure 2:
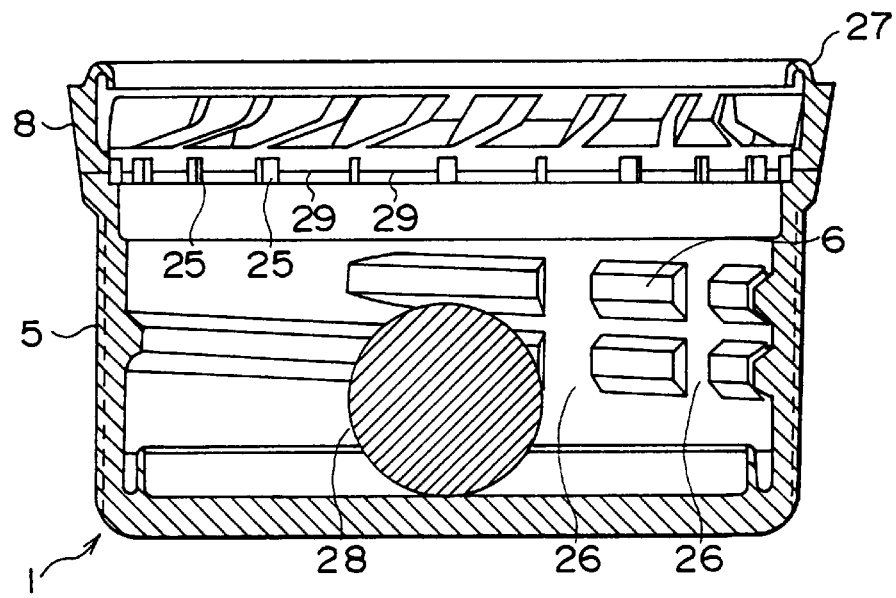
FIG. 2 is a diagram of a step for illustrating the method of molding a sealing liner in a container closure shell, and explains a step (A) of feeding a resin for molding the sealing liner.

Referring to FIG. 1 which illustrates a container closure of the present invention together with the mouth of a container, the container closure comprises a container closure shell 1 and a liner 2 provided in the inner portion thereof, and is fitted onto the mouth 3 of the container. The closure shell 1 is formed by integrally molding a synthetic resin by the injection molding or the compression molding, and comprises a top panel 4 and a skirt portion 5 hanging down from the peripheral edge of the top panel. An internal thread 6 is formed in the inner surface of the skirt portion 5 for being fastened to the mouth 3 of the container, and knurled grooves 7 are formed in the outer surface thereof so that the container closure can be gripped. A fastening band 8 equipped with flap pieces 8a for engagement with the container is provided on the lower side of the skirt portion 5 via a pilfer-proof mechanism 9 such as perforation that will be cut at the time of opening the closure.

The mouth 3 of the container is formed of a glass or a plastic, and an external thread 10 is formed on the side surface thereof for fastening and opening. On the lower side of the external thread 10 are formed a jaw portion 11 for engagement and a support ring 12 for supporting the container in the steps of charging and transfer. The mouth 3 of the container has a top portion 13 for maintaining sealing relative to the liner 2 and an outer peripheral portion 14 for sealing formed on the outer peripheral side of the top portion.

In the container closure of the present invention, an annular protruded portion 18 is provided inwardly from the inner surface 15 of the top panel and on the inside of a portion 16 near the root of the skirt maintaining a small gap 17 therebetween. In the embodiment shown in FIG. 1, an inner side surface 19 of the annular protruded portion 18 is substantially perpendicular to the inner surface of the top panel and has a flexible tip 20 that becomes narrow toward the end thereof and having an inner peripheral surface that is tilted slightly inwardly toward the end thereof.

The sealing liner 2 formed by the press-molding is provided on the inside of the top ceiling of the container closure shell 1. Here, it is important that a falling portion 21 of the liner is formed along the inner side surface 19 of the annular protruded portion 18 of the shell 1 from the standpoint of forming a sealing structure relative to the outer peripheral portion 14 for sealing of the mouth of the container maintaining excellent pressure-resistant sealing performance and shock-resistant sealing performance. The diagramed embodiment will now be described in further detail. Though it may vary depending upon the molding method, the sealing liner 2 has a thin central portion 22 and a thick surrounding portion 23 along the circumference thereof. The aforementioned substantially vertical portion 21 is formed on the outer peripheral side of the thick peripheral portion 23. A tapered downward protrusion 24 is formed between the thin central portion 22 and the thick peripheral portion 23. The tapered downward protrusion 24 is formed for the purpose of easily forming the thick peripheral portion and the substantially vertical portion, and its method of formation will be described later in detail.

Figure 3:
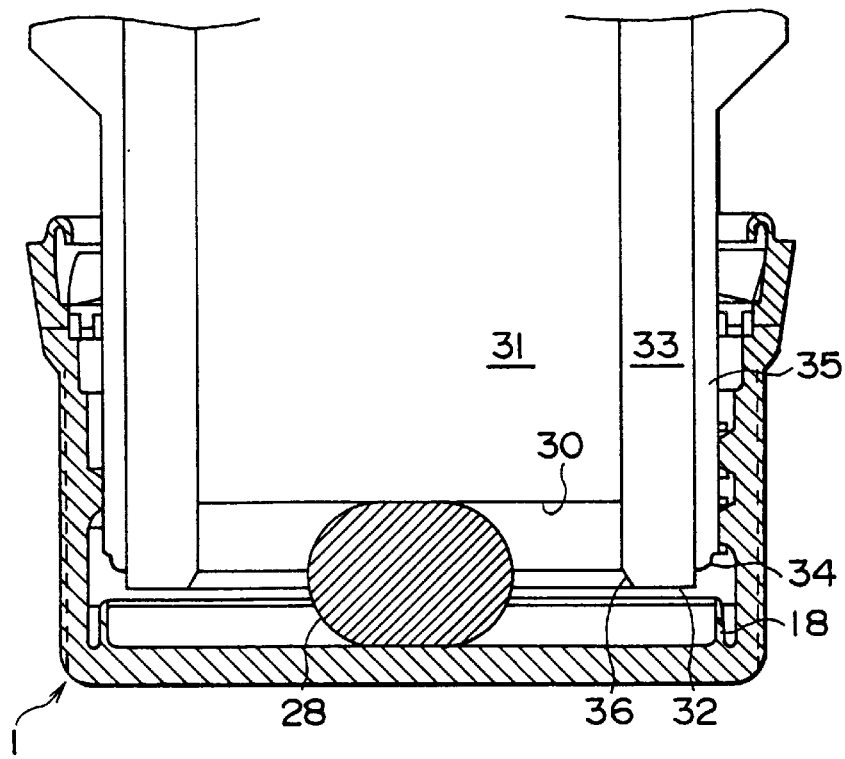
FIG. 3 is a diagram of a step for illustrating the method of molding a sealing liner in a container closure shell, and explains a step (B) for lowering the tool for molding the liner.
Figure 4:
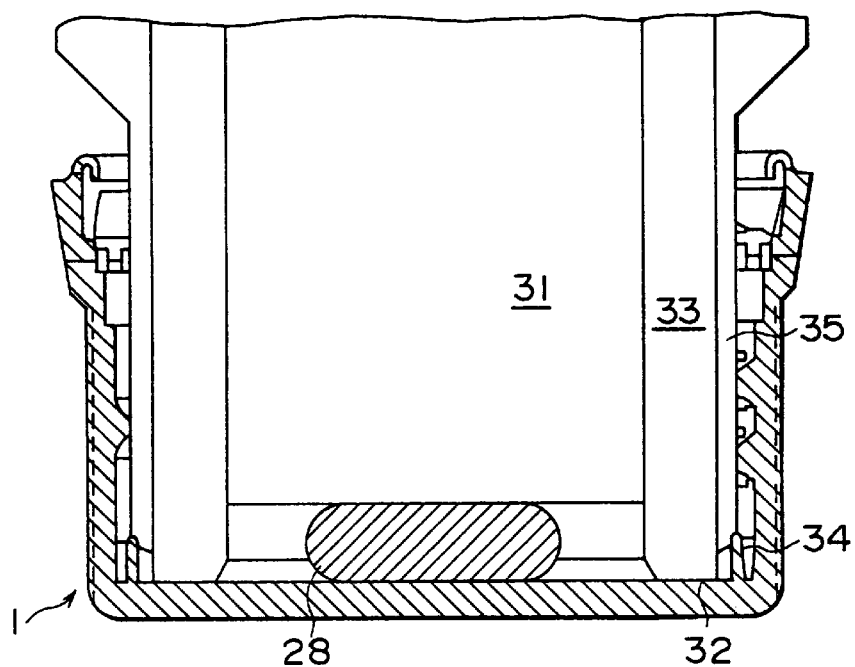
FIG. 4 is a diagram of a step for illustrating the method of molding the sealing liner in the container closure shell, and explains a step (C) where the preparation for molding is completed.
Figure 5:
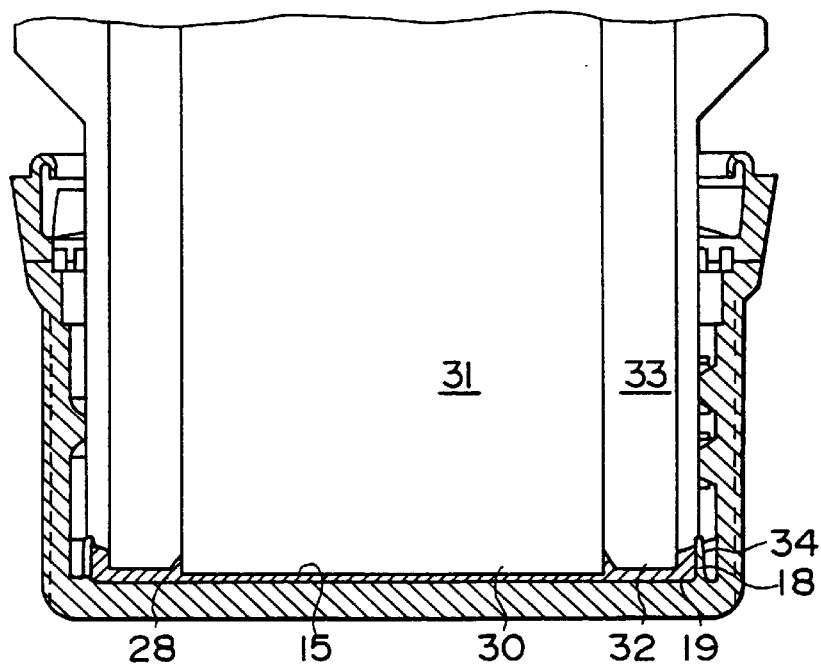
FIG. 5 is a diagram of a step for illustrating the method of molding the sealing liner in the container closure shell, and explains a step (D) where the molding is finished.

Referring to FIGS. 2 to 5 for explaining the method of molding the sealing liner in the container closure shell, FIG. 2(A) illustrates a step for feeding a resin for molding the sealing liner, FIG. 3(B) illustrates a step for lowering the tool for molding the liner, FIG. 4 (C) illustrates a step where the preparation for molding is completed, and FIG. 5(D) illustrates a step where the molding is finished.

The container closure shell 1 that is used is basically the same as the one shown in FIG. 1. FIG. 2(A), however, shows the structure in detail of when the container closure is viewed from the inside. That is, the above-mentioned perforation comprises a cutting line 29 for completely cutting the skirt portion 5 and the fastening band 8 from each other, and inner ribs 25 for coupling the skirt portion 5 and the fastening band 8 together in the circumferential direction maintaining a gap. The internal thread 6 formed in the inner surface of the skirt portion 5 is cut in the axial direction maintaining a predetermined distance in the circumferential direction thereby to form gas vent passages 26 of when the closure is opened. At the lower edge (upper end in FIG. 2) of the fastening band 8 is formed an inwardly faced curled portion 27 for reinforcing the flap pieces 8a that engage with the container. It will be further obvious that the flap pieces 8a are provided being tilted at a predetermined angle with respect to the radial direction in order to prevent the turn of the fastening band 8 relative to the mouth of the container at the time of fitting the closure and to reliably prevent the inner ribs 25 in the perforation from being cut.

In FIG. 2(A), the container closure shell 1 is held on an anvil (not shown) of the liner-molding machine in a manner that the top panel is on the lower side, and a nozzle of the extruder is passed into the container closure shell 1 to supply molten pellets 28 of a resin composition for molding the sealing liner.

Referring to FIG. 3(B), the assembly devices for molding the sealing liner comprise a core 31 having a tip 30 for molding the central portion of the liner, an intermediate bush 33 having a tip 32 for molding the sealing portion of the liner and a notch 36 formed in the inner peripheral side of the tip, and an outer sleeve 35 having a tip 34 for engagement with the annular protruded portion 18 of the container closure, which are all arranged in concentric with each other. The intermediate bush 33 is in a most downwardly protruded state, the outer sleeve 35 is in a slightly retreated state, and the core 31 is in a mostly retreated state. Though not diagramed, these members are connected to a pressurizing means such as hydraulic cylinder or to a pressurizing mechanism such as cam or the like via a resilient member such as spring, so as to be moved up and down. The core 31, intermediate bush 33 and outer sleeve 35 descend toward the container closure shell 1 while maintaining the above-mentioned state, and the core 31 starts pushing the molten pellet 28.

The assembly devices 31, 33 and 35 for molding continue to descend until the tip for molding the sealing portion of the liner of the intermediate bush 33 comes into engagement with the inner surface of the top panel of the container closure shell 1 as shown in FIG. 4(C), whereby the container closure shell 1 is reliably held. At the same time, the tip 34 for engagement of the outer sleeve 35 comes into engagement with the annular protruded portion 18 of the container closure maintaining sealing performance, whereby preparation is completed for molding the thick outer peripheral portion and the substantially vertical portion of the liner. Even during this moment, the core 31 continues to descend to press the molten pellets 28.

In the last stage of pushing shown in FIG. 5(D), the resin 28 for molding the liner filled between the tip 30 for molding the central portion of the liner and the inner surface 15 of the top panel, is still pushed by the core 31, flows due to the resin pressure into space defined by the outer side surface of the core 31 and the notch 36 of the intermediate bush 33, and causes the intermediate bush 33 to be retreated overcoming its pressure. Accordingly, the resin flows into space defined by the tip 32 for molding the sealing portion of the liner of the intermediate bush, peripheral portion on the inner surface 15 of the top panel, and inner side surface 19 of the annular protruded portion 18, whereby the central portion of the liner is molded having a reduced thickness, the peripheral portion of the liner is molded having a thickness larger than that of the central portion, and a substantially vertical portion (which is a rising portion since the container closure is placed upside down in the drawings) of the liner is molded on the inner side surface 19 of the annular protruded portion.

According to the method of producing container closures of the present invention, the annular protruded portion 18 and the outer sleeve 35 can be hermetically engaged with each other without causing the annular protruded portion 18 to be deformed since the annular protruded portion 18 is nearly vertically provided with respect to the top panel 4. As a result, it is allowed to mold the substantially vertical portion of the liner maintaining a very high dimensional precision without permitting the resin for molding the liner to be leaked. In molding the container closure shell 1, furthermore, since the annular protruded portion 18 that is molded is released from the metal mold without requiring any particular force, advantages are brought about with regard to easy molding maintaining any desired size without permitting any variation in the sizes of the annular protruded portion 18.

In the container closure of the present invention as shown in FIG. 1, furthermore, the sealing is accomplished owing to the intimate adhesion on an area having a predetermined width in the axial direction of the container between the substantially vertical portion 21 of the liner and the outer peripheral portion 14 for sealing of the mouth of the container. Therefore, even when deviation takes place between the container and the container closure relative to each other in the axial direction due to pressure or shock, excellent sealing performance is maintained. Moreover, the annular protruded portion 18 is independently provided maintaining a small gap from the skirt portion 5 of the closure shell. Therefore, even in case shock is exerted on the closure shell 1, the sealing portion is not affected or are affected very little. Besides, external force exerted on the mouth of the container in the radial direction is reduced due to elastic deformation of the annular protruded portion 18.

In the present invention, it is an indispensable requirement that a small gap is formed between the annular protruded portion 18 and the skirt portion 5 of the closure shell. As required, furthermore, a rib structure may be formed between the two.

Figure 6:
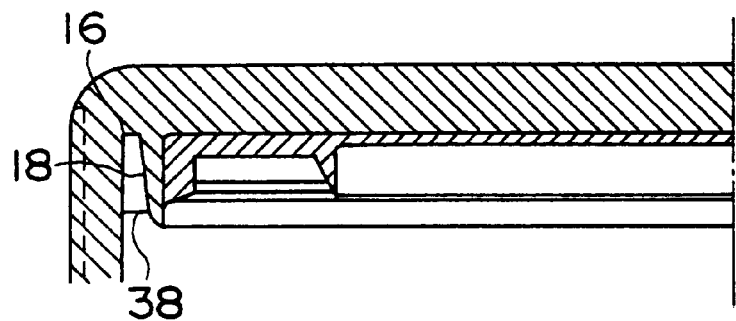
FIG. 6 is a side sectional view illustrating an embodiment of a rib structure.
Figure 7:
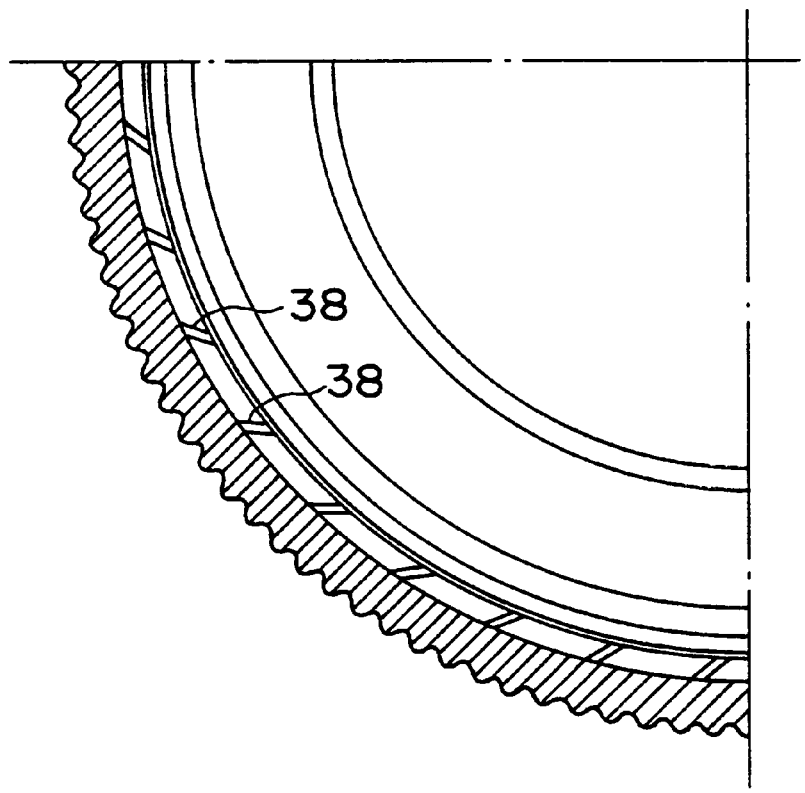
FIG. 7 is a bottom view of the embodiment of FIG. 6.
Figure 8:
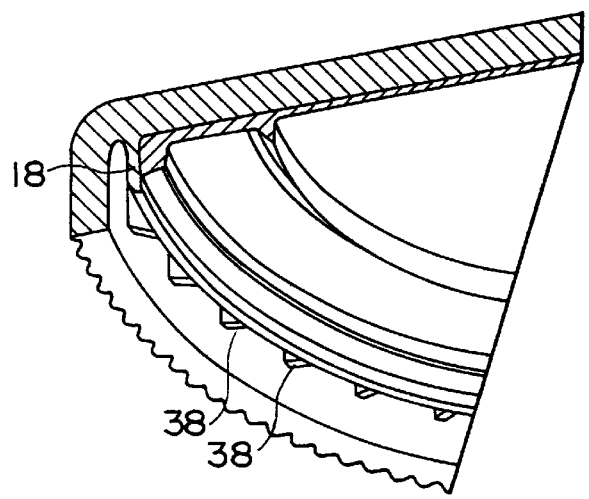
FIG. 8 is a perspective view of the embodiment of FIG. 6.

Referring to FIG. 6 (side sectional view), FIG. 7 (bottom view) and FIG. 8 (perspective view) illustrating an embodiment of the rib structure, a plurality of ribs 38 are disposed between the annular protruded portion 18 and the portion 16 near the root of the skirt to bridge them together along the circumferential direction maintaining a gap. The ribs 38 permit the annular protruded portion 18 to be deformed to some extent, but prevent them from being excessively deformed and further work to mechanically reinforce the annular protruded portion 18.

It is particularly desired that the plurality of ribs 38 are arranged at an angle which is tilted with respect to the radial direction, and that the direction of inward inclination of the ribs 38 is in agreement with the direction of opening the closure shell from the standpoint of easily opening the closure. This is because, with the outer periphery of the mouth being intimately sealed in accordance with the present invention, a slightly large torque is required for opening the closure. With the ribs being arranged as described, however, the closure can be opened by hand relatively easily.

Figure 9:
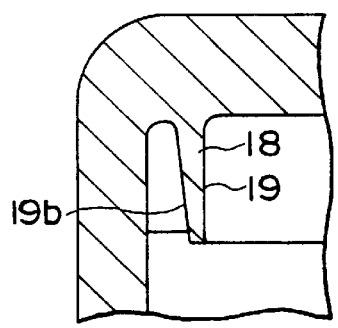
FIG. 9 is a sectional view illustrating, on an enlarged scale, an annular protruded portion of the container closure shell.
Figure 10:
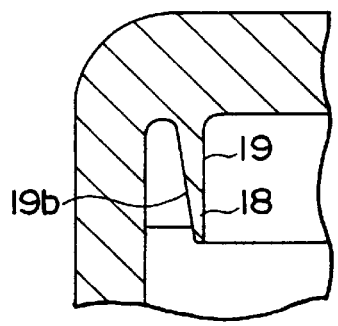
FIG. 10 is a sectional view illustrating, on an enlarged scale, the protruded portion of the container closure shell according to another embodiment.
Figure 11:
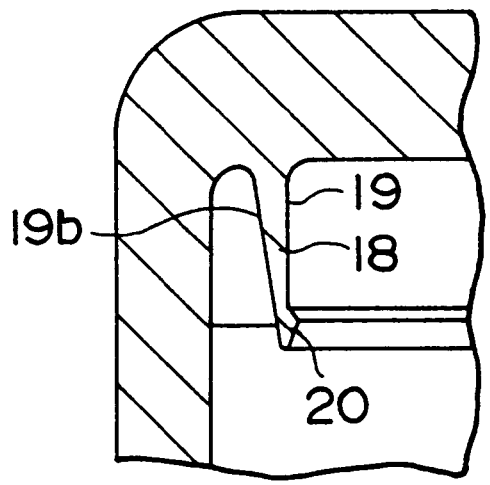
FIG. 11 is a sectional view illustrating, on an enlarged scale, the annular protruded portion having a flexible tip in the container closure shell.
Figure 12:
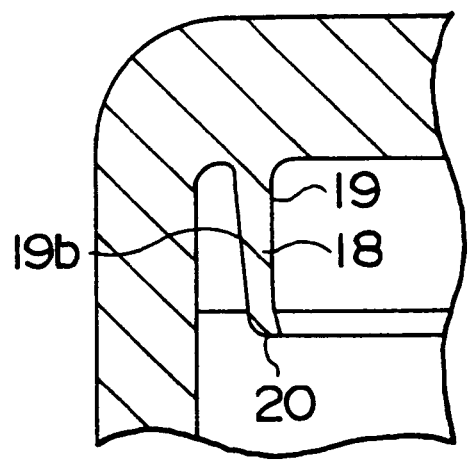
FIG. 12 is a sectional view illustrating, on an enlarged scale, the annular protruded portion having the flexible tip in the container closure shell according to a further embodiment.

Reference is now made to FIGS. 9 to 12 that illustrate the shape of the annular protruded portion of the container closure shell. Referring to FIG. 9, the annular protrusion 18 has a shape that becomes narrow inwardly toward the end thereof and further has the outer peripheral surface 19b that is inwardly tilted. The inner peripheral surface 19 of the annular protruded portion 18 is vertical. In an example of FIG. 10, the annular protruded portion 18 has a shape that becomes narrow inwardly toward the end thereof and further has the outer peripheral surface 19b that is inwardly tilted like the above-mentioned example. In this case, however, the inner peripheral surface 19 of the annular protruded portion 18 is slightly and inwardly tilted, too. In an example of FIG. 11, the annular protruded portion 18 has a shape that becomes narrow inwardly toward the end thereof and further has the outer peripheral surface 19b that is inwardly tilted. In this case, however, the annular tilted portion 18 has a flexible tip 20 that is inwardly protruded. In an example of FIG. 12, the annular protruded portion 18 has a shape that becomes narrow inwardly toward the end thereof and further has an outer peripheral surface 19b that is inwardly tilted. In this case, the inner peripheral surface 19 of the annular protruded portion 18 is vertical but has a flexible tip 20 that is tilted slightly inwardly.

The container closure shell should have a rigidity which is large enough to maintain sealing performance based upon the liner despite a pressure difference between the inside and the outside of the container, and should be made of a variety of plastics. Examples of the plastics may include high-density polyethylene, polypropylene, thermoplastic polyester, polyamide, styrene resin, ABS resin and the like. The shells will have such shapes as crown, screw cap, pilfer-proof cap, lag cap, etc.

According to the present invention, the liner stands for the one that is fitted to the container closure shell, molded at that place into a shape necessary for accomplishing the sealing, and has required cushioning property and softness. Examples of the resin for molding the liner include olefin resins such as low-, medium- or high-density polyethylene, isotactic polypropylene, propylene/ethylene copolymer, polybutene-1, ethylene/propylene copolymer, ethylene/butene-1 copolymer, propylene/butene-1 copolymer, ethylene/propylene/butene-1 copolymer, ethylene/vinyl acetate copolymer, tonically cross-linked olefin copolymer (ionomer), or blends thereof.

The above-mentioned olefin resins can be used being further blended with other elastomers such as ethylene/propylene copolymer rubber, ethylene/propylene/diene copolymer, SBR, NBR or thermoplastic elastomer.

Moreover, the liner may be molded by using a gel which is obtained by dispersing a vinyl chloride resin plastisol, i.e., a vinyl chloride resin in a plasticizer, or by using a gel which is obtained by dispersing an acrylic resin plastisol, i.e., an acrylic resin in a plasticizer followed by heating.

It is desired to use a blend of olefin resins from the standpoint of heat moldability. The liner used in the present invention may be provided with a resin layer containing a disoxidant. The liner may be made up of a resin containing the disoxidant alone or may be a composite material with the resin containing the disoxidant and another liner.

It is quite natural that the inner peripheral surface 19 of the annular protruded portion 18 has a diameter (r) which is larger than the diameter (R) of the outer peripheral sealing portion at the mouth of the container that is to be sealed but is smaller than the diameter of the threaded portion for engagement with the mouth of the container, and should hold the following relationship with respect to the thickness (d) of the substantially vertical portion 21 of the liner, i.e., r>R>r−d The height and thickness of the annular protruded portion 18 may differ depending upon the entire size of the container closure. Generally, however, the height should range from 1.6 to 2.3 mm and, particularly, from 2.0 to 2.2 mm, and the thickness should range from 0.2 to 0.5 mm and, particularly, from 0.3 to 0.4 mm.

Moreover, the substantially vertical portion (falling portion) 21 of the liner should have a thickness of from 0.4 to 1.0 mm and, particularly, from 0.5 to 0.8 mm, and a biting portion between the substantially vertical portion (falling portion) 21 of the liner and the outer peripheral sealing portion of the mouth of the container should have a size (R−(r−d)) of from about 0.2 to about 0.4 mm.

The container closure of the present invention permits a variety of modifications. In many cases, for instance, intimate adhesiveness is obtained to a very satisfactory degree between the container closure shell and the liner. In order to accomplish perfect adhesion, however, an adhesive may be applied to the inner peripheral surface of the container closure or the liner may be blended with a component for imparting adhesiveness. It is also possible to provide protrusions on the inner surface of the top panel of the container closure shell to increase mechanical engagement relative to the liner.

We claim:

1. A method of producing a plastic container closure with a liner, comprising the ordered steps of:

a) disposing a resin (28) for molding the liner on an inner surface of a top panel of a plastic container closure which has a skirt portion (5) threaded on an inside thereof for engagement with a mouth of a container, and an annular protruded portion (18) upstanding from the inner surface of the top panel and spaced by a small gap from the skirt portion;

b) arranging a core (31) having a tip (30) for molding a central portion of the liner, an annular intermediate bush (33 having a tip (32) with a recessed inner edge (36) for molding a sealing portion of the liner, and an annular outer sleeve (35) having a tip (34) for engagement with said annular protruded portion of the container closure, in a concentric orientation with one another;

c) advancing said tips toward the top panel of the container closure, so that said tip for engagement (34) is surface contacted with the inner circumferential surface of a forward end portion of the annular protruded portion of the container closure (18) and said tip for molding the sealing portion of the liner (32) is brought into engagement with the top panel of the container closure;

d) pressing the core (31) against the resin for molding the liner so that the intermediate bush (33) is raised by the resin pressure acting against the recessed inner edge; and e) flowing the resin into a space defined by said raised intermediate bush (33) and, said tip for engagement (34), to mold a central portion of the liner having a reduced thickness, a peripheral portion of the liner having a thickness larger than that of the central portion, and a substantially vertical portion of the liner on an inner side of said annular protruded portion (18).

2. A method according to claim 1 wherein said recessed inner edge defines a chamfer.

3. A method according to claim 1 wherein said annular intermediate bush is axially slideable relative to said core and said outer sleeve.

4. A method of forming a roof liner in a bottle cap, said bottle cap having a disk-shaped top member, an internally threaded skirt surrounding the top member and depending therefrom, and an annular ridge outstanding from the inner surface of the top member and spaced inwardly of the skirt by a small gap, the method comprising the steps of:

(a) assembling a three piece mold comprising a cylindrical central core, an annular intermediate bush having a recessed inner edge, and an annular outer sleeve such that the core, the bush, and the sleeve are concentrically oriented and the bush is axially displaceable to a limited degree relative to the core and the sleeve, (b) disposing a measured amount of a deformable resin on a central portion of the inner surface of the top member, (c) introducing the mold into the bottle cap such that an end of the core contacts the resin, an end of the bush seats against the inner surface of the top member, and a tip of the annular outer sleeve engaged with the annular ridge so that the tip of the annular outer sleeve is surface-contacted with the inner circumferential surface of a forward end portion of the annualr ridge, and (d) exerting sufficient pressure on the core to deform the resin radially outwardly such that it enters the recessed inner edge of the bush to axially displace it to said limited degree, and thereafter flows under the displaced end of the bush until the resin abuts an inner side of the ridge and the end of the sleeve.

* * * * *